United States Patent
Flordal

(10) Patent No.: US 9,324,163 B2
(45) Date of Patent: Apr. 26, 2016

(54) METHODS OF AND APPARATUS FOR COMPRESSING DEPTH DATA

(71) Applicant: ARM Limited, Cambridge (GB)

(72) Inventor: Oskar Flordal, Lund (SE)

(73) Assignee: ARM LIMITED, Cambridge (GB)

( * ) Notice: Subject to any disclaimer, the term of this patent is extended or adjusted under 35 U.S.C. 154(b) by 283 days.

(21) Appl. No.: 13/906,120

(22) Filed: May 30, 2013

(65) Prior Publication Data

US 2014/0354641 A1 Dec. 4, 2014

(51) Int. Cl.
 G06T 15/40 (2011.01)
 G06T 9/00 (2006.01)

(52) U.S. Cl.
 CPC .......................................... *G06T 9/00* (2013.01)

(58) Field of Classification Search
 None
 See application file for complete search history.

(56) References Cited

U.S. PATENT DOCUMENTS

| | | | | |
|---|---|---|---|---|
| 2003/0043295 A1* | 3/2003 | Reneau et al. | ............... | 348/554 |
| 2012/0212489 A1* | 8/2012 | Fisk | .............................. | 345/422 |
| 2013/0034309 A1 | 2/2013 | Nystad | | |
| 2014/0285626 A1 | 9/2014 | Fu et al. | | |

FOREIGN PATENT DOCUMENTS

WO 2012149084 A1 11/2012

OTHER PUBLICATIONS

Ström et al., "Floating-point buffer compression in a unified codec architecture." Proceedings of the 23rd ACM SIGGRAPH/EUROGRAPHIC symposium on Graphics hardware. Eurographics Association, 2008.*
Combined Search and Examination Report dated Nov. 28, 2014 in GB Patent Application No. GB1409587.1, 5 pages.
Hasselgren, et al., Lund University, "Efficient Depth Buffer Compression," Proceeding GH '06 Proceedings of the 21st ACM SIGGRAPH/EUROGRAPHICS symposium on Graphics hardware, 2006.

* cited by examiner

*Primary Examiner* — Kee M Tung
*Assistant Examiner* — Yi Wang
(74) *Attorney, Agent, or Firm* — Vierra Magen Marcus LLP

(57) ABSTRACT

A tile-based graphics processing system 3 has a write out stage 31 configured to compress depth data by dividing each depth value to be compressed into plural parts, forming plural depth data channels by associating corresponding ones of the plural parts of different depth values with each other and applying a data compression scheme separately to each depth data channel to be compressed in order to produce compressed representations of the depth data channels. The compressed representations of the depth data channels are written to external memory 34.

20 Claims, 5 Drawing Sheets

METHODS OF AND APPARATUS FOR COMPRESSING DEPTH DATA

BACKGROUND

The technology described herein relates to a method of and apparatus for compressing depth data in computer graphics processing systems. It also relates to the corresponding decompression method and apparatus.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture, and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

(In graphics literature, the term "rasterisation" is sometimes used to mean both primitive conversion to sample positions and rendering. However, herein "rasterisation" will be used to refer to converting primitive data to sampling point addresses only.)

The rasterising process determines the sample positions that should be used for a primitive (i.e. the (x, y) positions of the sampling points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sampling points (i.e. "shades" each sampling point). This can involve, as is known in the art, applying textures, blending sampling point data values, applying depth tests using depth data etc.

The data which is used to process or represent primitives at the sampling points may be temporarily stored in or retrieved from one or more buffers. In some cases, the buffered data may be written out to or read in from external memory. In order to reduce storage and bandwidth requirements on a graphics processing device when storing the buffered data in memory, it is known to try to store the buffered data in a compressed form. This is particularly useful for mobile and handheld devices that perform graphics processing, as such devices can be inherently limited in their storage and bandwidth capabilities. Normally some form of dedicated hardware is provided to perform the compression/decompression for each respective form of data that is to be compressed/decompressed (e.g. colour data).

Notwithstanding the known data compression/decompression arrangements, the Applicants believe that there remains scope for improved arrangements for compressing and decompressing depth data in computer graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
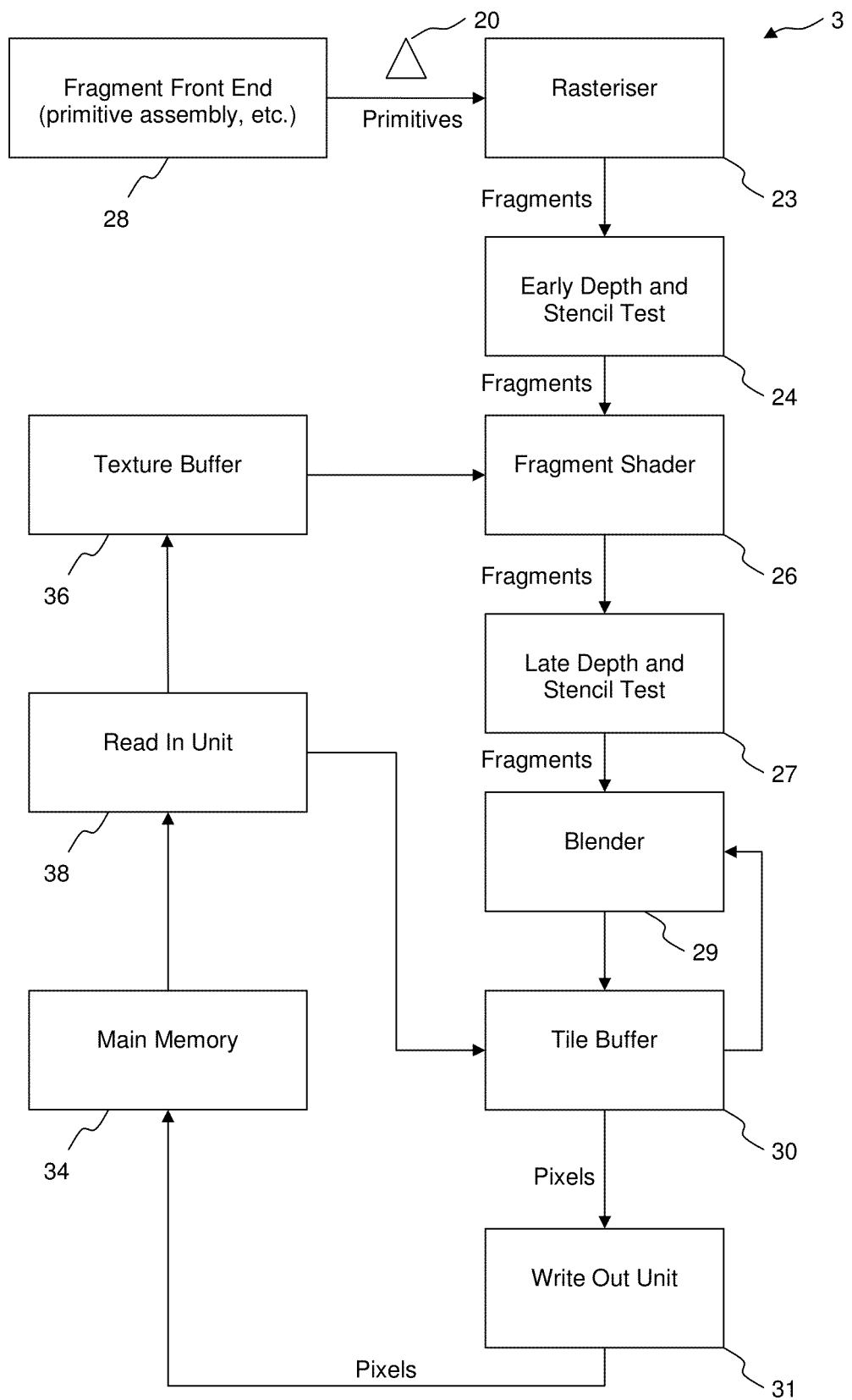
FIG. 1 shows schematically a graphics processing pipeline that can be operated in the manner of the technology described herein.

An embodiment of the technology described herein comprises a method of compressing depth data in a tile-based graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a depth buffer that stores an array of depth values; and a write out stage configured to write data stored in the tile buffer to external memory;

wherein the method comprises the write out stage when writing depth data from the tile buffer to external memory:

dividing each depth value to be compressed into plural parts;

forming plural depth data channels, wherein each depth data channel is formed by associating corresponding ones of the plural parts of different depth values with each other;

applying a data compression scheme separately to each depth data channel to be compressed in order to produce compressed representations of the depth data channels; and writing the compressed representations of the depth data channels to external memory.

Another embodiment of the technology described herein comprises a tile-based graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a depth buffer that stores an array of depth values; and a write out stage configured to write data stored in the tile buffer to external memory;

wherein the write out stage is configured to perform, when writing depth data from the tile buffer to external memory, a method of compressing depth data comprising:

dividing each depth value to be compressed into plural parts;

forming plural depth data channels, wherein each depth data channel is formed by associating corresponding ones of the plural parts of different depth values with each other;

applying a data compression scheme separately to each depth data channel to be compressed in order to produce compressed representations of the depth data channels; and writing the compressed representations of the depth data channels to external memory.

In the technology described herein, rather than applying a data compression scheme directly to depth values of depth data, the depth values are first divided into plural parts, and plural depth data channels are formed from the parts (i.e. the depth data channels are each formed from a group or set of corresponding depth value "parts" from different depth values). A data compression scheme is then applied separately to each of the depth data channels, rather than to the depth values as a whole.

Thus, for example, if each depth value in an array of depth values to be compressed is divided into three parts, the "first" parts of each depth value in the array will be associated with one another and compressed as a common "first" depth data channel, the "second" parts of each depth value in the array will be associated with one another and compressed as a common "second" depth data channel, and the "third" parts of each depth value in the array will be associated with one another and compressed as a common "third" depth data channel.

The Applicants have identified that, although additional processing may be needed to initially divide the depth values into plural parts and to associate corresponding ones of those parts from different depth values with each other so as to form depth data channels, compressing the plural associated parts separately as respective depth data channels can lead to a more efficient data compression process for applying to an array of depth values, and, as will be discussed further below, can facilitate the reuse of hardware that is provided for colour compression for compressing depth data as well.

For example, data compression/decompression processes have been developed which are particularly efficient at compressing buffered colour data for storage in external memory and correspondingly later decompressing the compressed colour data. This is typically achieved by applying a chosen data compression/decompression scheme separately to each colour data channel of the colour data (e.g. to each of the red (R) colour channel, green (G) colour channel and blue (B) colour channel). However, the known data compression/decompression schemes are not always so efficient when applied to data other than colour data, such as depth data. However, the Applicants have identified that dividing the depth values into plural parts, forming depth data channels from those parts, and compressing the depth data channels separately, can then allow, for example, known colour data compression/decompression schemes to also be used to compress depth data, thereby, e.g., allowing depth values to be compressed in a more efficient manner.

The concepts of the technology described herein can also be correspondingly applied to data decompression.

Thus, another embodiment of the technology described herein comprises a method of decompressing depth data in a tile-based graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a depth buffer that stores an array of depth values; and a read in stage configured to read data stored in external memory into the buffer;

wherein the method comprises the read in stage when reading compressed data stored in external memory into the buffer:

reading compressed representations of plural depth data channels stored in external memory, wherein each depth data channel comprises corresponding parts of a set of plural depth values that the plural depth data channels represent;

applying a data decompression scheme separately to each compressed representation to be decompressed so as to produce the plural depth data channels;

combining plural parts from the depth data channels so as to form the depth values from their plural parts; and writing the depth values to the buffer.

Another embodiment of the technology described herein comprises a tile-based graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a depth buffer that stores an array of depth values; and a read in stage configured to read data stored in external memory into the buffer;

wherein the read in stage is configured to perform, when reading compressed data stored in external memory into the buffer, a method of decompressing depth data comprising:

reading compressed representations of plural depth data channels stored in external memory, wherein each depth data channel comprises corresponding parts of a set of plural depth values that the plural depth data channels represent;

applying a data decompression scheme separately to each compressed representation to be decompressed so as to produce the plural depth data channels;

combining plural parts from the depth data channels so as to form the depth values from their plural parts; and writing the depth values to the buffer.

The above embodiments of the technology described herein can and in embodiments do include any one or more or all of the optional features of the technology described herein, as appropriate. For example, embodiments of the technology described herein include compressing data in the manner disclosed herein and then decompressing that compressed data in the manner disclosed herein and vice versa. In these arrangements, the buffer may be a depth buffer, colour buffer, tile buffer, texture buffer, etc.

The data compression/decompression schemes which are used in the technology described herein can take any desired and suitable form. However, in embodiments, the data compression/decompression schemes are also suitable for compressing/decompressing (and in embodiments are used to compress/decompress) colour data channels.

Thus, another embodiment of the technology described herein comprises a method of compressing data in a tile-based graphics processing system that comprises:

a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a colour buffer that stores an array of colour datasets, each colour dataset comprising plural colour values that correspond respectively to plural colour data channels, and an allocated amount of memory for use as a depth buffer that stores an array of depth values; and a write out stage configured to write data stored in the tile buffer to external memory;

wherein the method comprises the write out stage when writing data from the tile buffer to external memory:

when writing out colour data, applying a data compression scheme separately to each colour data channel to be compressed in order to produce compressed colour data, and writing the compressed colour data to external memory; and when writing out depth data, dividing each depth value to be compressed into plural parts, forming plural depth data channels, wherein each depth data channel is formed by associating corresponding ones of the plural parts of different depth values with each other, applying the data compression scheme separately to each depth data channel to be compressed in order to produce compressed representations of the depth data channels, and writing the compressed representations of the depth data channels to external memory.

Another embodiment of the technology described herein comprises a tile-based graphics processing system comprising:

a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a colour buffer that stores an array of colour datasets, each colour dataset comprising plural colour values that correspond respectively to plural colour data channels, and an allocated amount of memory for use as a depth buffer that stores an array of depth values; and a write out stage configured to write data stored in the tile buffer to external memory;

wherein the write out stage is configured to perform, when writing data from the tile buffer to external memory, a method of compressing data comprising:

when writing out colour data, applying a data compression scheme separately to each colour data channel to be compressed in order to produce compressed colour data, and writing the compressed colour data to external memory; and when writing out depth data, dividing each depth value to be compressed into plural parts, forming plural depth data channels, wherein each depth data channel is formed by associating corresponding ones of the plural parts of different depth values with each other, applying the data compression scheme separately to each depth data channel to be compressed in order to produce compressed representations of the depth data channels, and writing the compressed representations of the depth data channels to external memory.

Another embodiment of the technology described herein comprises a method of decompressing data in a tile-based graphics processing system that comprises:

a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a colour buffer that stores an array of colour datasets, each colour dataset comprising plural colour values that correspond respectively to plural colour data channels, and an allocated amount of memory for use as a depth buffer that stores an array of depth values; and a read in stage configured to read data stored in external memory to the buffer;

wherein the method comprises the read in stage when reading compressed data from external memory to the buffer:

when reading in colour data, applying a data decompression scheme separately to each compressed colour data channel to be decompressed in order to produce decompressed colour data, and writing the decompressed colour data to the colour buffer; and when reading in depth data, reading compressed representations of plural depth data channels stored in external memory, wherein each depth data channel comprises corresponding parts of a set of plural depth values that the plural depth data channels represent, applying the data decompression scheme separately to each compressed representation to be decompressed so as to produce the plural depth data channels, combining plural parts from the depth data channels so as to form the depth values from their plural parts, and writing the depth values to the buffer.

Another embodiment of the technology described herein comprises a tile-based graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a colour buffer that stores an array of colour datasets, each colour dataset comprising plural colour values that correspond respectively to plural colour data channels, and an allocated amount of memory for use as a depth buffer that stores an array of depth values; and a read in stage configured to read data stored in external memory to the buffer;

wherein the read in stage is configured to perform, when reading compressed data from external memory to the buffer, a method of decompressing data comprising:

when reading in colour data, applying a data decompression scheme separately to each compressed colour data channel to be decompressed in order to produce decompressed colour data, and writing the decompressed colour data to the colour buffer; and when reading in depth data, reading compressed representations of plural depth data channels stored in external memory, wherein each depth data channel comprises corresponding parts of a set of plural depth values that the plural depth data channels represent, applying the data decompression scheme separately to each compressed representation to be decompressed so as to produce the plural depth data channels, combining plural parts from the depth data channels so as to form the depth values from their plural parts, and writing the depth values to the buffer.

These embodiments of the technology described herein are particularly advantageous since the same compression/decompression scheme is used to compress/decompress colour values and depth values. Thus, there is no need to devise and provide processing resources (e.g. hardware) for two compression/decompression schemes.

In embodiments, the colour channels to be compressed/decompressed comprise at least three (for example, and in an embodiment, only three) colour channels. Each colour channel in an embodiment indicates colour values for a particular colour in the colour datasets. For example, the colour channels to be compressed/decompressed may comprise (only) a red colour channel for indicating red colour values in the colour datasets, a green colour channel for indicating green colour values in the colour datasets, and a blue colour channel for indicating blue colour values in the colour datasets.

In embodiments, each colour value (i.e. the value for each colour channel in each colour dataset) indicates a colour using a number of bits. The number of bits is in an embodiment the same number of bits for each colour value. In embodiments, the number of bits for each colour value is 8 bits.

In embodiments, the number of bits in each dataset is equal to the number of bits for each colour value multiplied by the number of colour data channels. For example, in embodiments in which the number of bits for each colour value is 8 bits and in which there are three colour channels, the number of bits for each colour dataset is 24 bits. Other data may be associated (and stored in the colour buffer) with the colour datasets such as data for representing transparency (alpha) and/or metadata. This other data may or may not be compressed/decompressed together with the colour datasets, as desired.

Similarly, in embodiments, each depth value indicates depth using a number of bits. The number of bits is in an embodiment the same number of bits for each depth value. In embodiments, the number of bits for each depth value is the same as the number of bits in each colour dataset. In embodiments, the number of bits for each depth value is 24 bits. Again, other data may be associated (and stored in the depth buffer) with the depth values such as stencil data and/or metadata. This other data may or may not be compressed/decompressed together with the depth values, as desired.

Embodiments of the technology described herein comprise dividing each depth value to be compressed into plural parts and/or combining decompressed depth data channels so as to form decompressed depth values from their respective plural parts. In embodiments, as discussed above, each depth value indicates depth using a number of bits. In embodiments, each part comprises a different subset of the set of bits which represent the depth value. The number of bits in each subset is in an embodiment the same number of bits for each part. In embodiments, the number of bits in each part is the same as the number of bits used to indicate each colour value. In embodiments, the number of bits in each depth value part is 8 bits.

The set of bits which represent each depth value can be divided into subsets for the parts in any desired and suitable (but in an embodiment the same) way. In embodiments, the set of bits which represent each depth value are divided into subsets to derive the parts of the depth value based on the significance of the bits within the bit representation of the depth value. For example, in embodiments, a subset of the most significant bits of the depth value (e.g. the 8 most significant bits of a 24-bit depth value) forms a first part derived from the depth value, a subset of bits between the most significant bits and the least significant bits of the depth value (e.g. the 8 middle bits of a 24-bit depth value) forms a second part derived from the depth value, and a subset of the least significant bits of the depth value (e.g. the 8 least significant bits of a 24-bit depth value) forms a third part derived from the depth value.

The values represented by the least significant bits of the depth values may vary to a relatively greater extent such that compression of the least significant bits is relatively poor. However, the Applicants have identified that the values of the most significant bits of the depth values generally vary to a relatively lesser extent (and indeed in some cases (e.g. for some generally flat scenes to be rendered) do not vary at all) such that compression of the most significant bits is relatively very good. Thus, the Applicants have identified that dividing the set of bits for each depth value into subsets based on the significance of the bits within the bit representation of the depth value can lead to very good compression.

The steps of dividing the depth values into depth data channels and then applying the data compression scheme separately to each depth data channel can be performed by the write out unit directly on the depth data that is stored in the depth buffer. However, in embodiments in which the data compression scheme is also applied to colour data that is stored in a colour buffer, this may require the write out unit to be configured to access both the data stored in the depth buffer and the data stored in the colour buffer. Although this is possible, and indeed some embodiments operate in this way, it may not always be desirable or possible to do this.

Thus, in other embodiments, dividing each depth value stored in the depth buffer to be compressed into plural parts, comprises mapping or transferring the parts of each depth value to be compressed from the depth buffer to respective colour channels of a colour dataset in the colour buffer. In embodiments, a subset of the most significant bits of the depth value (e.g. the 8 most significant bits of a 24-bit depth value) are mapped or transferred to a first colour channel (e.g. red) in the colour buffer, a subset of bits between the most significant bits and the least significant bits of the depth value (e.g. the 8 middle bits of a 24-bit depth value) are mapped or transferred to a second colour channel (e.g. green) in the colour buffer, and a subset of the least significant bits of the depth value (e.g. the 8 least significant bits of a 24-bit depth value) are mapped or transferred to a third colour channel (e.g. blue) in the colour buffer.

The step of applying the data compression scheme separately to each depth data channel can then be performed by the write out unit on the depth data that is stored in the colour buffer. These embodiments are particularly advantageous in that the write out unit need only be configured to access the data that is stored in the colour buffer.

Similarly, in embodiments in which the data decompression scheme is applied to compressed depth data and colour data stored in external memory, the read in unit may be configured to write decompressed data to both the depth buffer and the colour buffer. However, as discussed above, it may not always be desirable or possible to do this.

Thus, in embodiments, the step of applying the data decompression scheme separately to each compressed representation is performed by the read in unit prior to writing the decompressed depth data channels to respective colour channels in the colour buffer. Combining the decompressed depth data channels so as to form decompressed depth values from their respective plural parts then comprises mapping or transferring the parts of each decompressed depth value from a colour dataset in the colour buffer to the depth value in the depth buffer. In embodiments, for each depth value, a subset of the most significant bits of the depth value (e.g. the 8 most significant bits of a 24-bit depth value) are mapped or transferred from a first colour channel (e.g. red) of a dataset in the colour buffer to the depth value in the depth buffer, a subset of bits between the most significant bits and the least significant bits of the depth value (e.g. the 8 middle bits of a 24-bit depth value) are mapped or transferred from a second colour channel (e.g. green) of the dataset in the colour buffer to the depth value in the depth buffer, and a subset of the least significant bits of the depth value (e.g. the 8 least significant bits of a 24-bit depth value) are mapped or transferred from a third colour channel (e.g. blue) of the dataset in the colour buffer to the depth value in the depth buffer. These embodiments are particularly advantageous in that the read in unit need only be configured to access (write to) the colour buffer.

As discussed above, the data compression/decompression schemes which are used in the technology described herein can take any desired and suitable form. However, in embodiments, the data compression/decompression schemes are lossless data compression/decompression schemes. This can allow, for example, the data which is compressed to be fully recovered by decompression later on.

As is also discussed above, the data compression/decompression schemes are in an embodiment particularly suitable for compressing/decompressing colour data and/or are frame buffer compression (FBC) schemes. In general, the technology described herein can be used with any form of image coding scheme where the input to be encoded is separated into different colour channels. It can be used, for example, with predictive coding schemes and transform based coding schemes (such as jpeg).

Some such schemes apply a transform (e.g. a YUV transform) to the data to be compressed. Essentially, the data (e.g. colour data) to be compressed is converted from a first n-channel format (e.g. a 3-channel format such as a RGB format) to a second n-channel format (e.g. a 3-channel format such as a YUV format) before being compressed. Similarly, the compressed data (e.g. colour data) is decompressed and is converted from the second n-channel format (e.g. a 3-channel format such as a YUV format) to the first n-channel format (e.g. a 3-channel format such as a RGB format). Thus, in embodiments, the data compression/decompression scheme may comprise applying a transform (e.g. a YUV transform) to the data to be compressed and/or to the decompressed data.

The Applicants, however, have identified that the correlation between the depth data channels in some embodiments is generally relatively weaker than the correlation between the colour data channels. Thus, in embodiments in which the data compression/decompression scheme comprises applying a transform (e.g. a YUV transform), the transform (e.g. the YUV transform) is in an embodiment disabled when applying the data compression/decompression scheme to the depth data channels and/or is in an embodiment (only) enabled when applying the data compression/decompression scheme to the colour data channels. Similarly, in an embodiment, the data compression/decompression scheme that is used is a scheme that does not apply a YUV transform to the data to be compressed.

In an embodiment, the data compression/decompression scheme is the data compression/decompression scheme described in US 2013/0034309, the disclosure of which is incorporated herein by reference in its entirety.

The compressed depth data may be stored for later use, and, e.g., read back in to the pipeline and decompressed for use when performing subsequent graphics processing, depth tests, etc.

Similarly, the compressed colour data may be stored for later use, and, e.g., read back in to the pipeline and decompressed for use when performing subsequent graphics processing, blending, shading, etc.

The technology described herein can be used for all suitable forms of input and output that a graphics processing pipeline may be used to process and/or generate, such as frames for display, render-to-texture outputs, etc.

In some embodiments, the graphics processing pipeline comprises, and/or is in communication with, one or more memories and/or memory devices that store the data described herein, such as the compressed colour data, compressed depth data etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry, and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, if desired.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus the technology described herein extends to a graphics processor and to a graphics processing platform including the apparatus of or operated in accordance with any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

FIG. 1 shows a graphics processor 3 according to one embodiment of the technology described herein. The graphics processor 3 shown in FIG. 1 is a tile-based graphics processing pipeline and will thus, as is known in the art, produce tiles of a render output data array, such as an output frame to be generated.

As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 20 for input to the rasterisation process have been generated. Thus, at this point the graphics data (the vertex data) has undergone fragment frontend operations 28, such as transformation and lighting operations (not shown), and a primitive set-up stage (not shown) to set-up the primitives to be rendered, in response to the commands and vertex data provided to the graphics processor, as is known in the art.

As shown in FIG. 1, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates, as is known in the art, to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs, is known in the art, a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. The textures may be stored in external memory 34, and may be read from the external memory 34 into a texture buffer 36 that is accessible to the fragment shader 26. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z-buffer within the tile buffer 30. (The colour buffer and Z-buffer will store, as is known in the art, an appropriate colour, etc., or Z-value, respectively, for each sampling point that the buffers represent (in essence for each sampling point of a tile that is being processed).) The colour buffer and Z-buffer store, as is known in the art, an array of fragment data that represents part of the render output (e.g. image to be displayed).

In the present embodiment, the tile buffer 30 comprises an allocated portion of RAM that is located on (local to) the graphics processing pipeline (on-chip).

The, e.g. colour, data from the tile buffer 30 is input to a write out unit 31, and thence output (written back) to an output buffer, such as a frame buffer of a display device (not shown). (The display device could comprise, e.g., a display comprising an array of pixels, such as a computer monitor or a printer.)

Once a tile of the render output has been processed and its data exported to external memory (e.g. to a frame buffer (not shown) in the main memory 34) for storage, the next tile is then processed, and so on, until sufficient tiles have been processed to generate the entire render output (e.g. frame (image) to be displayed).

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

Embodiments in which data is compressed will be described with reference to FIGS. 2 and 3.

Figure 2:
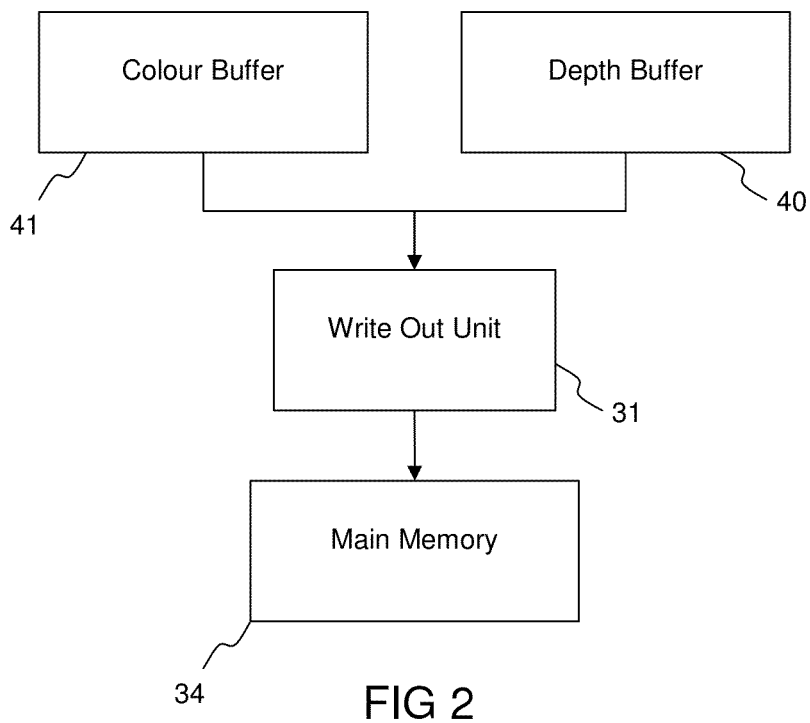
FIG. 2 shows an arrangement for compressing data according to one embodiment of the technology described herein.

FIG. 2 shows a colour buffer 41, which in this embodiment forms part of the tile buffer 30. As is known in the art, the colour buffer 41 stores an array of colour datasets for a corresponding array of sampling positions, with each dataset containing red, green and blue colour values for its corresponding sampling position. The colour values are derived as a result of a graphics processing operation carried out in respect of the sampling positions by the graphics processing pipeline 3.

In this embodiment, each of the three colour values for each colour dataset is represented by an 8 bit number such that each colour dataset comprises 24 bits. The red colour values from the different datasets of the array constitute a red colour channel, the green colour values from the different datasets of the array constitute a green colour channel, and the blue colour values from the different datasets of the array constitute a blue colour channel.

In this embodiment, when the colour values are to be written out to main memory 34, the write out unit 31 accesses and compresses each of the colour channels stored in the colour buffer 41 separately using a frame buffer compression (FBC) scheme. In this embodiment, the FBC scheme is that which is described in US 2013/0034309, the disclosure of which is incorporated herein by reference in its entirety.

The compressed colour data is then written out to main memory 34. The compressed colour data may later be decompressed and used, for example, by the blender 29 or by the fragment shader 26 of the graphics processing pipeline 3 as texture data.

Figure 6:
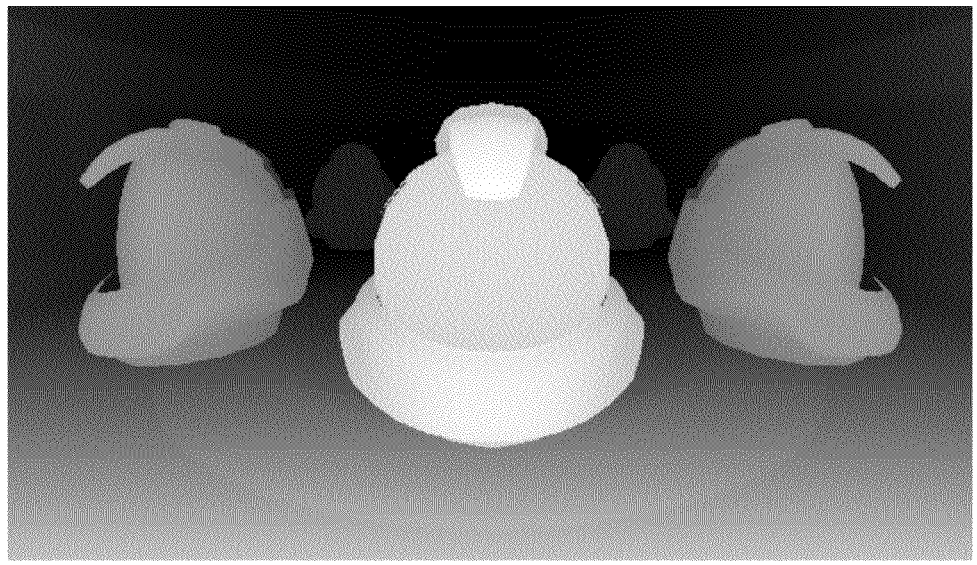
FIG. 6 is a visual representation of an array of depth values according to an embodiment of the technology described herein.

FIG. 2 also shows a depth buffer 40, which in this embodiment also forms part of the tile buffer 30. As is known in the art, the depth buffer 40 stores an array of depth values corresponding respectively to the array of sampling positions. The depth values are also derived as a result of a graphics processing operation carried out in respect of the sampling positions by the graphics processing pipeline 3. In this embodiment, each of the depth values is represented by a 24 bit number. FIG. 6 is a visual representation of an exemplary array of depth values mapped to luminance values according to this embodiment of the technology described herein.

In this embodiment, the write out unit 31 has access to the depth buffer 40, and divides each depth value stored in the depth buffer 40 into three parts, with each part comprising 8 bits. In this embodiment, for each 24-bit depth value, a first 8-bit part is derived from the 8 most significant bits of the depth value, a second 8-bit part is derived from the 8 middle bits of the depth value, and a third 8-bit part is derived from the 8 least significant bits of the depth value.

Figure 7A:
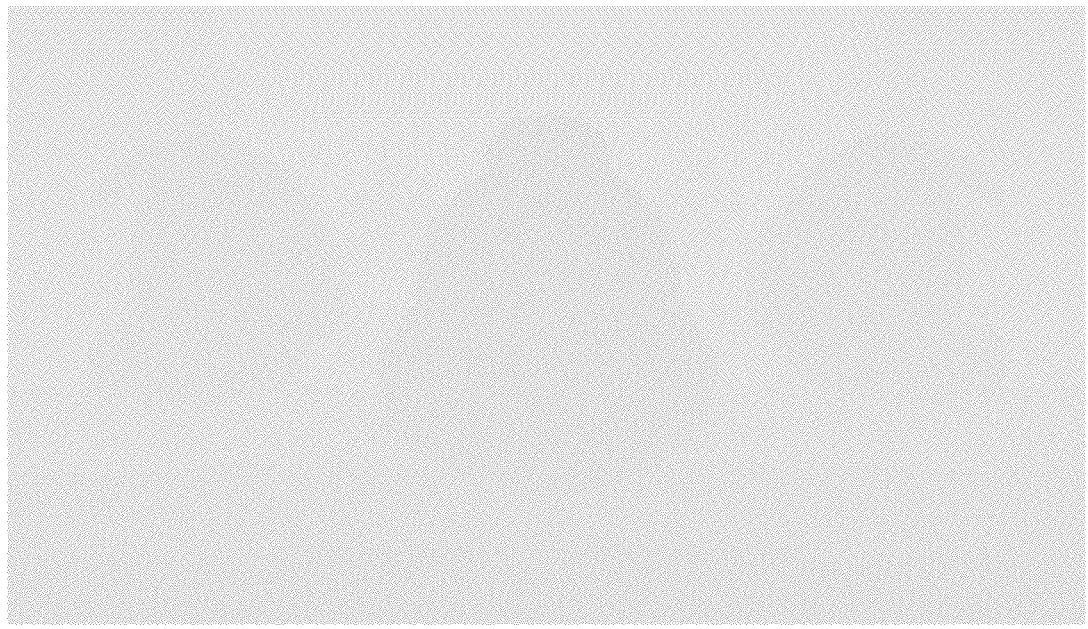
FIGS. 7A, 7B and 7C are visual representations of respective depth data channels derived from the array of depth values of FIG. 6.
Figure 7B:
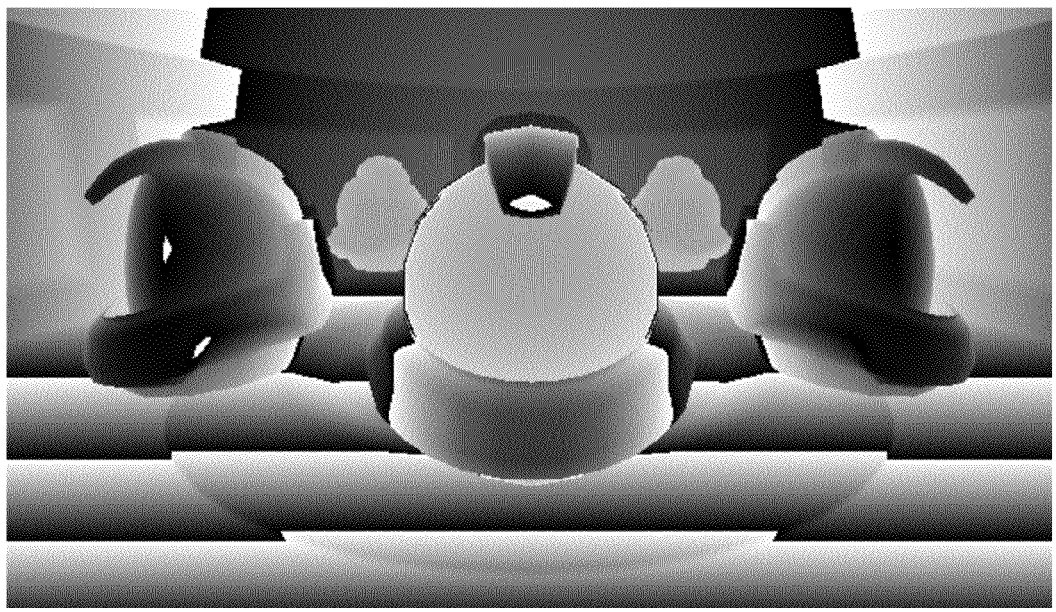
Figure 7C:
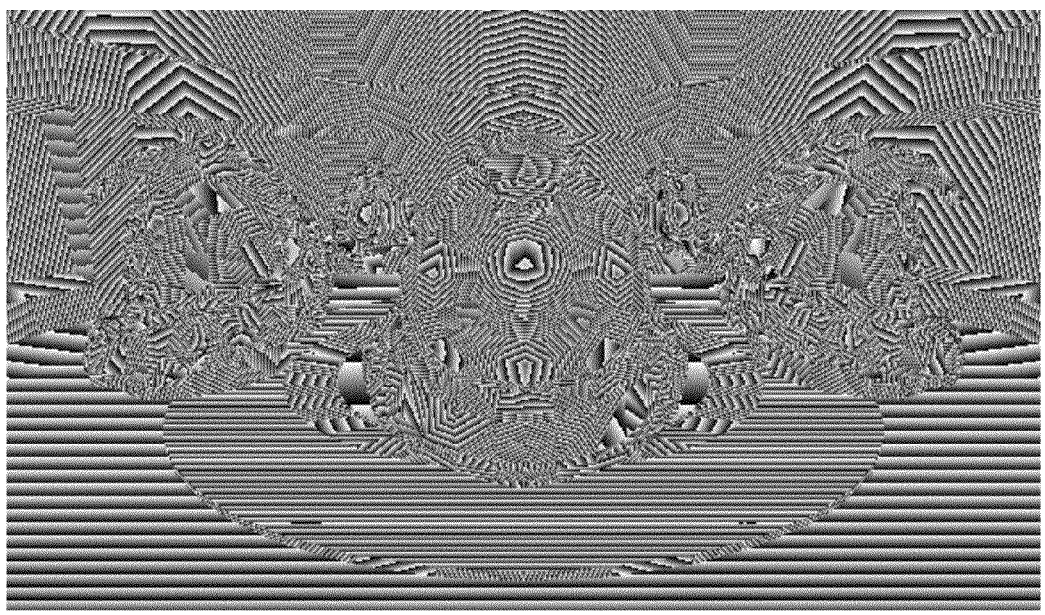

The write out unit 31 then associates the first parts of the depth values with each other to form a first depth data channel, associates the second parts of the depth values with each other to form a second depth data channel, and associates the third parts of the depth values with each other to form a third depth data channel. FIGS. 7A, 7B and 7C are respective visual representations of the first, second and third depth data channels formed from the exemplary array of depth values illustrated in FIG. 6 when mapped to greyscale. As will be appreciated from these figures, although the data represented by FIG. 7C (and to a lesser extent FIG. 7B) may not compress so well, the data represented by FIG. 7A can be greatly compressed.

The write out unit 31 then compresses each of the depth data channels separately using the FBC scheme (effectively treating each depth data channel in the same way as it would a colour channel). This arrangement allows the same data compression scheme to be efficiently applied both to colour data and depth data.

The compressed depth data is then written out to main memory 34. The compressed depth data may later be decompressed and used, for example, by the depth test stages of the graphics processing pipeline 3.

Figure 3:
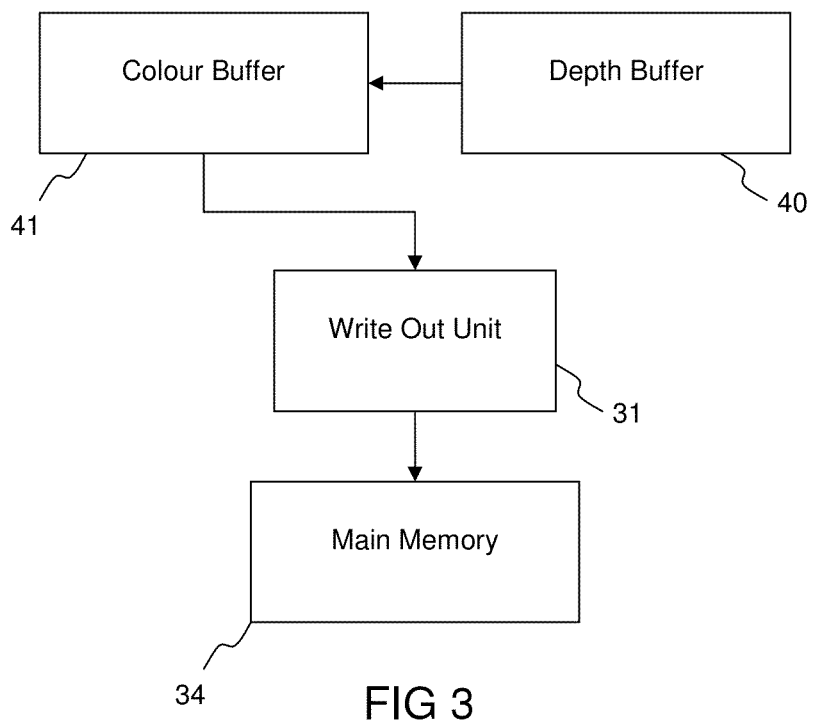
FIG. 3 shows an arrangement for compressing data according to another embodiment of the technology described herein.

FIG. 3 shows a similar arrangement to that which is shown in FIG. 2. However, in this embodiment, the write out unit 31 does not directly access the depth buffer 40. Instead, the array of depth values which are stored in the depth buffer 40 are divided and mapped to colour channels in the colour buffer 41. In this embodiment, the 8 most significant bits of each 24-bit depth value are mapped to the red channel of a corresponding colour dataset in the colour buffer 41, the 8 middle bits of each 24-bit depth value are mapped to the green channel of a corresponding colour dataset in the colour buffer 41, and the 8 least significant bits of each 24-bit depth value are mapped to the blue channel of a corresponding colour dataset in the colour buffer 41. The red, green and blue colour channels in the colour buffer 41 therefore contain the depth data for the respective depth data channels discussed above.

The write out unit 31 can then simply compress each of the depth channels stored in the colour buffer 41 separately using the FBC scheme in the same manner that it would compress colour channels stored in the colour buffer 41. This arrangement simplifies the configuration of the write out unit 31.

The compressed depth data is then written out to main memory 34. As discussed above, the compressed depth data may later be decompressed and used, for example, by the depth test stages of the graphics processing pipeline 3.

Embodiments in which the data is decompressed will be described with reference to FIGS. 4 and 5.

Figure 4:
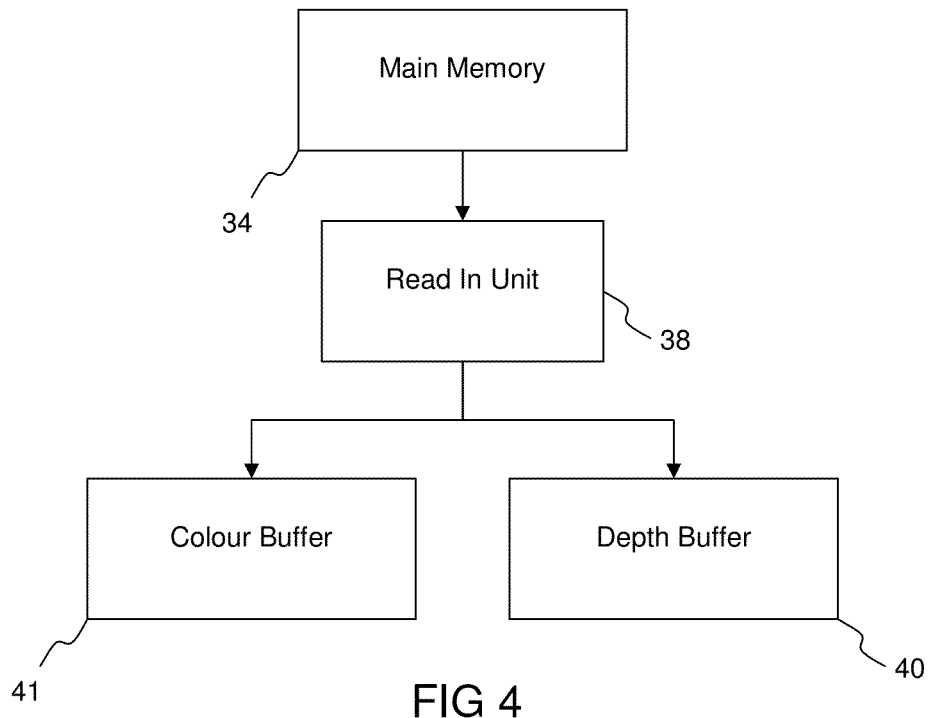
FIG. 4 shows an arrangement for decompressing data according to one embodiment of the technology described herein.

FIG. 4 shows the main memory 34 and read in unit 38 of the graphics processor 3. As discussed above, compressed representations of the colour data channels and compressed representations of the depth data channels are stored in the main memory 34, and are read into the read in unit 38 from the main memory 34.

In this embodiment, the read in unit 38 decompresses each of the compressed representations of the colour channels separately using the FBC scheme. The decompressed colour data is then written to a colour buffer 41, which in this embodiment forms part of the texture buffer 36. The compressed colour data could also or instead be written to a colour buffer in the tile buffer 30, if so desired. The decompressed colour data is then used, for example, by the blender 29 or by the fragment shader 26 of the graphics processing pipeline 3 as texture data.

In this embodiment, the read in unit 38 has access to the depth buffer, which in this embodiment forms part of the tile buffer 30. The read in unit 38 decompresses each of the compressed representations of the depth channels separately using the FBC scheme. The decompressed depth data channels are then recombined so as to form decompressed depth values. The decompressed depth values are then written to the depth buffer 40. The decompressed depth values are then used, for example, by the depth test stages of the graphics processing pipeline 3.

Figure 5:
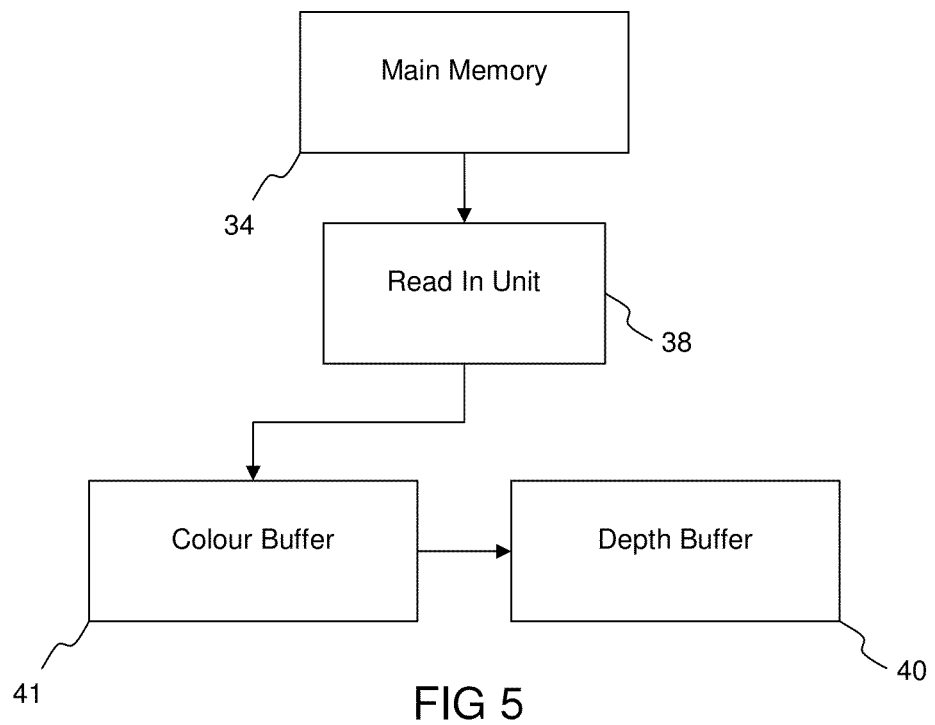
FIG. 5 shows an arrangement for decompressing data according to another embodiment of the technology described herein.

FIG. 5 shows a similar arrangement to that which is shown in FIG. 4. However, in this embodiment, the read in unit 38 does not directly access the depth buffer 40. Instead, in the same manner that the read in unit 38 would decompress colour channels, the read in unit 38 decompresses the compressed representations of the depth data channels separately using the FBC scheme, and the decompressed depth data channels are written to corresponding colour data channels in the colour buffer 41. The decompressed depth data channels parts are then recombined and mapped from the colour buffer 41 to data values in the depth buffer 40. This arrangement simplifies the configuration of the read in unit 38.

The decompressed depth values are then used, for example, by the depth test stages of the graphics processing pipeline 3.

As will be appreciated from the above, the technology described herein in its embodiments at least comprises a system that can efficiently compress/decompress depth data. This is achieved in the embodiments of the technology described herein at least by separately compressing/decompressing depth data channels formed from parts of depth values rather compressing/decompressing the depth values as a whole.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of compressing depth data in a tile-based graphics processing system that comprises:
   a graphics processing pipeline comprising:
   a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
   a tile buffer configured to store rendered fragment data locally to the graphics processing pipeline prior to that data being written out to an external memory, the tile buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and
   a write out stage configured to write data stored in the tile buffer to external memory;
   wherein the method comprises the write out stage when writing depth data from the tile buffer to memory:
   dividing each depth value to be compressed into plural parts;
   forming plural depth data channels, wherein each depth data channel is formed by associating corresponding ones of the plural parts of different depth values with each other;
   applying a data compression scheme separately to each depth data channel to be compressed in order to produce compressed representations of the depth data channels; and
   writing the compressed representations of the depth data channels to memory; and
   wherein the step of dividing each depth value stored in the depth buffer to be compressed into plural parts comprises storing the parts of each depth value to be compressed in respective colour channels of a colour dataset in the colour buffer; and
   the step of applying the data compression scheme separately to each depth data channel is performed by the write out unit on the depth data that is stored in the colour buffer.

2. The method of claim 1, wherein the data compression scheme is a data compression scheme that is used for compressing colour data channels.

3. The method of claim 1, further comprising:
   the write out stage when writing colour data from the tile buffer to memory:
   applying a data compression scheme separately to each colour data channel to be compressed in order to produce compressed colour data, and
   writing the compressed colour data to memory; and
   the write out stage when writing depth data from the tile buffer to memory:
   applying the data compression scheme used when writing colour data from the tile buffer to memory separately to each depth data channel to be compressed in order to produce the compressed representations of the depth data channels.

4. The method of claim 1, wherein the data compression scheme is a frame buffer compression scheme.

5. The method of claim 1, wherein the data compression scheme can apply a YUV transform to data being compressed, and method further comprises disabling the YUV transform when applying the data compression scheme to the depth data channels.

6. The method of claim 1, wherein each depth value is divided into three parts.

7. The method of claim 1, wherein each depth value is represented as a set of bits, and each depth value is divided into plural parts based on the significance of the bits within the bit representation of the depth value.

8. A method of decompressing depth data in a tile-based graphics processing system that comprises:
   a graphics processing pipeline comprising:
   a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
   a buffer configured to store data locally to the graphics processing pipeline for use by the graphics processing pipeline, the buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and
   a read in stage configured to read data stored in external memory into the buffer;
   wherein the method comprises the read in stage when reading compressed depth data stored in external memory into the buffer:
   reading compressed representations of plural depth data channels stored in external memory, wherein each depth data channel comprises corresponding parts of a set of plural depth values that the plural depth data channels represent;

applying a data decompression scheme separately to each compressed representation to be decompressed so as to produce the plural depth data channels;

combining plural parts from the depth data channels so as to form the depth values from their plural parts; and writing the depth values to the buffer; and wherein:

the step of applying the data decompression scheme separately to each compressed representation performed by the read in stage is followed by a step of writing the decompressed depth data channels to respective colour channels of a colour data set in the colour buffer; and the step of combining the decompressed depth data channels so as to form decompressed depth values from their respective plural parts comprises transferring the parts of each decompressed depth value from the colour dataset in the colour buffer to a depth value in the depth buffer.

9. The method of claim 8, comprising:

the read in stage when reading compressed colour data from external memory into the buffer:

applying a data decompression scheme separately to each compressed colour data channel to be decompressed in order to produce decompressed colour data, and writing the decompressed colour data to the colour buffer; and the read in stage when reading compressed depth data from external memory into the buffer:

applying the data decompression scheme used when reading compressed colour data from external memory into the buffer separately to each compressed representation of a depth data channel to be decompressed so as to produce the plural depth data channels.

10. A tile-based graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and a write out stage configured to write data stored in the tile buffer to external memory;

wherein the write out stage is configured to, when writing depth data from the tile buffer to memory, compress depth data such that the write out stage divides each depth value to be compressed into plural parts;

forms plural depth data channels, wherein each depth data channel is formed by associating corresponding ones of the plural parts of different depth values with each other;

applies a data compression scheme separately to each depth data channel to be compressed in order to produce compressed representations of the depth data channels; and writes the compressed representations of the depth data channels to memory;

and wherein:

the write out stage is configured to divide each depth value stored in the depth buffer to be compressed into plural parts by storing the parts of each depth value to be compressed in respective colour channels of a colour dataset in the colour buffer; and is configured to apply the data compression scheme to the depth data that is stored in the colour buffer.

11. The system of claim 10, wherein the data compression scheme is a data compression scheme that is used for compressing colour data channels.

12. The system of claim 10, wherein the write out stage is configured to, when writing colour data from the tile buffer to external memory;

apply a data compression scheme separately to each colour data channel to be compressed in order to produce compressed colour data, and write the compressed colour data to memory; and the write out stage is configured to, when writing depth data from the tile buffer to external memory:

apply the data compression scheme used when writing colour data from the tile buffer to memory separately to each depth data channel to be compressed in order to produce the compressed representations of the depth data channels.

13. The system of claim 10, wherein the data compression scheme is a frame buffer compression scheme.

14. The system of claim 10, wherein the data compression scheme can apply a YUV transform to data being compressed, and the write out stage is further configured to disable the YUV transform when applying the data compression scheme to the depth data channels.

15. The system of claim 10, wherein each depth value is divided into three parts.

16. The system of claim 10, wherein each depth value is represented as a set of bits, and each depth value is divided into plural parts based on the significance of the bits within the bit representation of the depth value.

17. A tile-based graphics processing system comprising:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and a read in stage configured to read data stored in external memory into the buffer;

wherein, when reading compressed data stored in external memory into the buffer, the read in stage is configured to decompress depth data such that the read in stage:

reads compressed representations of plural depth data channels stored in external memory, wherein each depth data channel comprises corresponding parts of a set of plural depth values that the plural depth data channels represent;

applies a data decompression scheme separately to each compressed representation to be decompressed so as to produce the plural depth data channels;

combines plural parts from the depth data channels so as to form the depth values from their plural parts; and writes the depth values to the buffer;

and wherein:

the read in stage is configured to:

apply the data decompression scheme separately to each compressed representation;

to then write the decompressed depth data channels to respective colour channels of a colour data set in the colour buffer; and to then combine the decompressed depth data channels so as to form decompressed depth values from their respective plural parts by transferring the parts of each decompressed depth value from the colour dataset in the colour buffer to a depth value in the depth buffer.

18. The system of claim 17, wherein the read in stage is configured to, when reading compressed data from external memory into the buffer:

apply a data decompression scheme separately to each compressed colour data channel to be decompressed in order to produce decompressed colour data, and write the decompressed colour data to the colour buffer; and the read in stage is configured to, when reading compressed depth data from external memory into the buffer:

apply the data decompression scheme used when reading compressed colour data from external memory into the buffer separately to each compressed representation of a depth data channel to be decompressed so as to produce the plural depth data channels.

19. A non-transitory computer readable storage medium storing computer software code which when executing on a processor performs a method of compressing depth data in a tile-based graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory, the tile buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and a write out stage configured to write data stored in the tile buffer to external memory;

wherein the method comprises the write out stage when writing depth data from the tile buffer to memory:

dividing each depth value to be compressed into plural parts;

forming plural depth data channels, wherein each depth data channel is formed by associating corresponding ones of the plural parts of different depth values with each other;

applying a data compression scheme separately to each depth data channel to be compressed in order to produce compressed representations of the depth data channels; and writing the compressed representations of the depth data channels to memory; and wherein the step of dividing each depth value stored in the depth buffer to be compressed into plural parts comprises storing the parts of each depth value to be compressed in respective colour channels of a colour dataset in the colour buffer; and the step of applying the data compression scheme separately to each depth data channel is performed by the write out unit on the depth data that is stored in the colour buffer.

20. A non-transitory computer readable storage medium storing computer software code which when executing on a processor performs a method of decompressing depth data in a tile-based graphics processing system that comprises:

a graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a buffer configured to store data locally to the graphics processing pipeline for use by the graphics processing pipeline, the buffer comprising an allocated amount of memory for use as a depth buffer that stores an array of depth values and an allocated amount of memory for use as a colour buffer that stores an array of colour datasets, each colour dataset comprising plural colour values that correspond respectively to plural colour data channels; and a read in stage configured to read data stored in external memory into the buffer;

wherein the method comprises the read in stage when reading compressed depth data stored in external memory into the buffer:

reading compressed representations of plural depth data channels stored in external memory, wherein each depth data channel comprises corresponding parts of a set of plural depth values that the plural depth data channels represent;

applying a data decompression scheme separately to each compressed representation to be decompressed so as to produce the plural depth data channels;

combining plural parts from the depth data channels so as to form the depth values from their plural parts; and writing the depth values to the buffer; and wherein:

the step of applying the data decompression scheme separately to each compressed representation performed by the read in stage is followed by a step of writing the decompressed depth data channels to respective colour channels of a colour data set in the colour buffer; and the step of combining the decompressed depth data channels so as to form decompressed depth values from their respective plural parts comprises transferring the parts of each decompressed depth value from the colour dataset in the colour buffer to a depth value in the depth buffer.

* * * * *

UNITED STATES PATENT AND TRADEMARK OFFICE
CERTIFICATE OF CORRECTION

PATENT NO. : 9,324,163 B2
APPLICATION NO. : 13/906120
DATED : April 26, 2016
INVENTOR(S) : Flordal It is certified that error appears in the above-identified patent and that said Letters Patent is hereby corrected as shown below:

In the claims,

At column 19, line 18 (claim 9, line 1): please insert -- further -- before "comprising".

Signed and Sealed this
Nineteenth Day of July, 2016

Michelle K. Lee
*Director of the United States Patent and Trademark Office*